United States Patent [19]

Muramatsu

[11] Patent Number: 4,599,661
[45] Date of Patent: Jul. 8, 1986

[54] MECHANISM FOR DRIVING CAPSTANS IN TAPE RECORDERS

[75] Inventor: Hiroshi Muramatsu, Gunma, Japan

[73] Assignee: Victor Company of Japan, Limited, Japan

[21] Appl. No.: 456,325

[22] Filed: Jan. 6, 1983

[30] Foreign Application Priority Data

Jan. 12, 1982 [JP] Japan .................... 57-2317[U]

[51] Int. Cl.$^4$ .......................................... G11B 15/00
[52] U.S. Cl. ........................ 360/96.2; 226/181; 242/199
[58] Field of Search .......... 360/96.2; 242/192, 199, 242/200, 75.5; 474/122, 158–160, 78–83, 87, 6; 226/40–41, 178, 181, 182, 189

[56] References Cited

U.S. PATENT DOCUMENTS 3,409,239 11/1968 Siebert .................. 226/181 X
3,533,544 10/1970 Schulz .
3,900,174 8/1975 Morimoto et al. .
3,948,464 4/1976 Hata ...................... 242/192
3,974,982 8/1976 Stone ..................... 242/192

FOREIGN PATENT DOCUMENTS 2129083 10/1972 France .
2081958 2/1982 United Kingdom .
2087626 5/1982 United Kingdom .
2105088 3/1983 United Kingdom .

OTHER PUBLICATIONS

Patent Abstracts of Japan, vol. 4, No. 160, 8 Nov. 1980, p. 147P35 & JP-A-55-108953.

Primary Examiner—A. J. Heinz
Attorney, Agent, or Firm—Lowe, Price, Leblanc, Becker & Shur

[57] ABSTRACT

A mechanism for driving a pair of capstans includes a pair of first and second flywheels mounted respectively on the capstans and each having coaxial smaller- and larger-diameter portions, a capstan motor having a pulley including a pair of barrel-shaped portions, an endless belt looped around the pulley and the flywheels, and a pair of belt shifter arms for selectively shifting the endless belt between a first position in which the endless belt is looped around the larger-diameter portion of the first flywheel, the smaller-diameter portion of the second flywheel, and the first barrel-shaped portion, and a second position in which the endless belt is looped around the smaller-diameter portion of the first flywheel, the larger-diameter portion of the second flywheel, and the second barrel-shaped portion. When a magnetic tape is driven by the capstans to travel in a direction from the first to second flywheels, the endless belt is in the first position to tension the magnetic tape between the capstans. When a magnetic tape is driven by the capstans to travel in an opposite direction from the second to first flywheels, the endless belt is in the second position to tension the magnetic tape between the capstans.

5 Claims, 2 Drawing Figures

MECHANISM FOR DRIVING CAPSTANS IN TAPE RECORDERS

BACKGROUND OF THE INVENTION

The present invention relates to a mechanism for driving capstans in a tape recorder.

One known mechanism for driving a pair of capstans in a tape recorder includes a pair of flywheels of equal diameters which are attached to the capstans, respectively, and rotated by an endless belt driven by the pulley of a capstan motor. A magnetic tape is fed along when it is held against the capstans by pinch rollers or idlers, respectively, when the capstan motor is energized. During operation of the capstan mechanism, the endless belt, when leaving the one of the flywheels which is positioned downstream of the other in the direction of feed of the magnetic tape, tends to be tensioned since it is directly pulled by the motor pulley. On the other hand, the endless belt as it is to engage the other flywheel is liable to sag since the endless belt has just left the motor pulley. Therefore, the capstan on the downstream flywheel rotates slightly faster than the other capstan, thus tensioning a portion of the magnetic tape between the capstans. When the rotation of the motor is reversed to feed the magnetic tape backward, the magnetic tape portion between the capstans is also tensioned as the capstans rotate at slightly different speeds due to varied tensioning of the endless belt for the reasons described above. The tension thus imposed on the magnetic tape however can easily vary when the endless belt becomes permanently stretched or has its contact surface smeared or otherwise damaged.

There has been proposed a mechanism including a pair of capstans having different diameters or a pair of flywheels having different diameters for tensioning a magnetic tape by rotating the capstans at different speeds, that is, slower at the upstream capstan and higher at the downstream capstan. While the proposed arrangement is effective in running the magnetic tape at relatively constant tension, the speeds of rotation of the capstans must remain unchanged, and hence the magnetic tape cannot be fed in a reverse direction as by reversing the rotation of the capstan motor.

SUMMARY OF THE INVENTION

It is an object of the present invention to provide a capstan driving mechanism for sufficiently tensioning a magnetic tape between a pair of flywheel-driven capstans when flywheels are driven by a capstan motor to feed the magnetic tape in either a forward or reverse direction.

According to the present invention, a capstan driving mechanism for use in a tape recorder comprises a pair of capstans having first and second flywheels, respectively, each including smaller- and larger-diameter portions coaxially spaced from each other. A capstan motor has a pulley including a pair of first and second pulley portions coaxially spaced from each other. An endless belt is looped around the pulley and the first and second flywheels in driving relation thereto, and a pair of idlers presses a magnetic tape against the capstans to cause the magnetic tape to travel selectively in a first direction from the first to second flywheels and a second direction from the second to first flywheels in reponse to energization of the motor. Means is provided for shifting the endless belt between a first position in which the endless belt is looped around the larger-diameter portion of the first flywheel, the smaller-diameter portion of the second flywheel, and the first pulley portion when the magnetic tape runs in the first direction, and a second position in which the endless belt is looped around the smaller-diameter portion of the first flywheel, the larger-diameter portion of the second flywheel, and the second pulley portion when the magnetic tape runs in the second direction, whereby the capstans can be rotated at different speeds to tension a portion of the magnetic tape which extends between the capstans.

BRIEF DESCRIPTION OF THE DRAWINGS

The present invention will be described in detail by way of illustrative example with reference to the accompanying drawings, in which.

DETAILED DESCRIPTION

Figure 1:
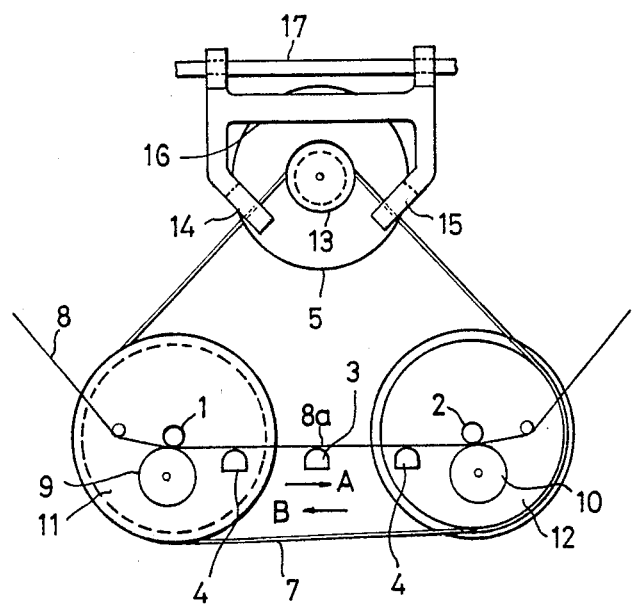
FIG. 1 is a plan view of a capstan driving mechanism according to the present invention.
Figure 2:
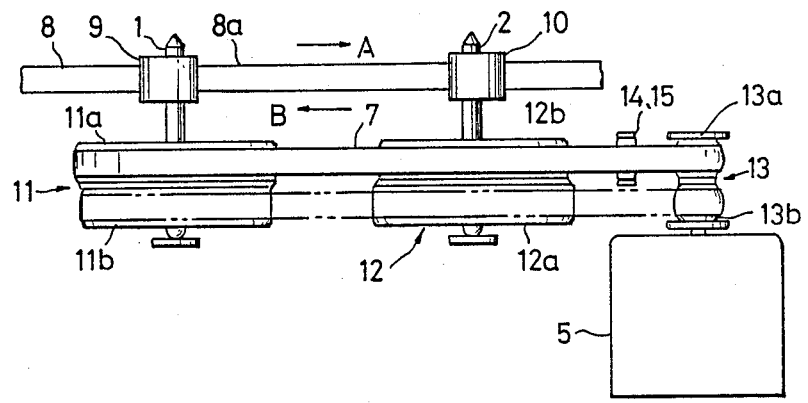
FIG. 2 is a side elevational view of the capstan driving mechanism illustrated in FIG. 1, with a capstan motor shown displaced for the sake of clarity.

As shown in FIGS. 1 and 2, a pair of capstans 1, 2 are rotatably mounted on a tape recorder base (not shown) and have a pair of flywheels 11, 12, respectively, attached to lower ends of the capstans 1, 2. The flywheel 11 is composed of an upper larger-diameter portion 11a and a lower smaller-diameter portion 11b which are axially spaced from each other and held in coaxial alignment with each other. The flywheel 12 is composed of a lower larger-diameter portion 12a and an upper smaller-diameter portion 12b which are axially spaced from each other and held in coaxial alignment with each other. The upper larger-diameter portion 11a of the flywheel 11 and the upper smaller-diameter portion 12b of the flywheel 12 lie in a first common plane, and likewise the lower smaller-diameter portion 11b of the flywheel 11 and the lower larger-diameter portion 12a of the flywheel 12 lie in a second common plane which extends parallel to and is closely spaced from the first common plane. A recording/playback head 3 is mounted on the tape recorder base (not shown) between the flywheels 11, 12. A pair of erasing heads 4, 4 are positioned one on each side of the recording/playback head 3.

A pair of soft-surfaced pinch rollers or idlers 9, 10 are urged by springs (not shown) in a direction toward the capstans 1, 2, respectively. A magnetic tape 8 passes between the capstan 1 and the idler 9 and between the capstan 2 and the idler 10, and is held against the capstans 1, 2 by the idlers 9, 10, respectively. When the capstans 1, 2 are driven to rotate about their own axes, the magnetic tape 8 is fed along past the recording/playback head 3.

A capstan motor 5 is also mounted on the tape recorder base (not shown) and has a motor pulley 13 of an axially elongate demension comprising a pair of axially spaced upper and lower portions 13a, 13b which have barrel-shaped surfaces and are located respectively in the first and second common planes. An endless belt 7 (e.g. rubber) is looped around the flywheels 11, 12 and the pulley 13.

A pair of belt shifter arms 14, 15 are joined together by a connecting bar 16 and angularly movably supported on a support rod 17 which is mounted on the tape recorder base. The belt shifter arms 14, 15 are positioned one on each side of the pulley 13 in overhanging relation to the capstan motor 5 and angularly movable about the support rod 17 between upper and lower positions corresponding respectively to the first and second common planes. Each of the belt shifter arms 14, 15 has a forked end in and across which the belt 7 is guided to travel.

Operation of the capstan driving mechanism thus constructed is as follows: When the belt shifter arms 14, 15 are in the upper position as shown by the solid lines in FIG. 2, the belt 7 travels around the upper pulley portion 13a, the upper larger-diameter portion 11a of the flywheel 11, and the upper smaller-diameter portion 12b of the flywheel 12. The capstan motor 5 is energized to drive the flywheels 11, 12 for feeding the magnetic tape 8 in the direction of the arrow A (forward direction). At this time, the capstan 2 rotates at a speed higher than that of rotation of the capstan 1 to tension a portion 8a of the tape 8 which runs between the capstans 1, 2. When the belt shifter arms 14, 15 are in the lower position as shown by the two-dot-and-dash lines in FIG. 2, the belt extends around the lower pulley portion 13b, the lower smaller-diameter portion 11b of the flywheel 11, and the lower larger-diameter portion 12a of the flywheel 12. The capstan motor 5 is energized to feed the magnetic tape 8 in the direction of the arrow B (reverse direction) so that the capstan 1 rotates faster than the capstan 2 to tension the magnetic tape portion 8a.

The smaller-diameter portions 11b, 12b of the flywheels 11, 12 are of equal diameters, and the larger-diameter portions 11a, 12a thereof are of equal diameters. Therefore, the magnetic tape portion 8a is subjected to the constant tension irrespective of the direction of travel of the magnetic tape 8. An actual difference between the diameters of the larger- and smaller-diameter flywheel portions may be on the order of 0.5% of the diameter of the larger-diameter portion. The two belt shifter arms 14, 15 one on each side of the pulley 13 are required for the reason that the upstream one located with respect to the belt 7 traveling toward the pulley 13 mainly serves to shift the endless belt 7 on the pulley 13, and they can effectively shift the belt 7 when the belt 7 travels in either the forward or reverse direction.

Since the flywheels 11, 12 are of the same dimension, they can provide equalized inertia so that wow and flutter will be the same in both directions of travel of the magnetic tape 7.

Although a certain preferred embodiment of the present invention has been shown and described in detail, it should be understood that various changes and modifications may be made therein without departing from the scope of the appended claims.

What is claimed is:

1. A capstan driving mechanism for use in a tape recorder, comprising:
    a pair of capstans each having first and second flywheels, each flywheel including smaller- and larger-diameter portions coaxially spaced from each other;
    a capstan motor having a pulley including a pair of first and second pulley portions coaxially spaced from each other, said capstan motor being rotatable selectively in opposite directions;
    an endless belt looped around said pulley and said first and second flywheels in driving relation thereto;
    a pair of idlers for pressing a magnetic tape against said capstans, respectively, to cause the magnetic tape to travel, said magnetic tape being drivable selectively in a first direction from said first to second flywheels and a second direction from said second to first flywheels in response to energization of said motor; and
    arm means loosely gripping said endless belt therein for shifting said endless belt between a first position in which said endless belt is looped around said larger-diameter portion of said first flywheel, said smaller-diameter portion of said second flywheel, and said first pulley portion when the magnetic tape runs in said first direction, and a second position in which said endless belt is looped around said smaller-diameter portion of said first flywheel, said larger-diameter portion of said second flywheel, and said second pulley portion when the magnetic tape runs in said second direction, whereby said capstans rotate at different speeds to tension a portion of the magnetic tape which extends between said capstans.

2. A capstan driving mechanism according to claim 1, wherein each of said first and second pulley portions has a barrel-shaped surface against which said endless belt is held.

3. A capstan driving mechanism according to claim 1, wherein said smaller-diameter portions of said first and second flywheels have equal diameters, and said larger-diameter portions of said first and second flywheels have equal diameters.

4. A capstan driving mechanism for use in a tape recorder, comprising:
    a pair of capstans each having first and second flywheels, each flywheel including smaller- and larger-diameter portions coaxially spaced from each other;
    a capstan motor having a pulley including a pair of first and second pulley portions coaxially spaced from each other, said capstan motor being rotatable selectively in opposite directions;
    an endless belt looped around said pulley and said first and second flywheels in driving relation thereto;
    a pair of idlers for pressing a magnetic tape against said capstans, respectively, to cause the magnetic tape to travel, said magnetic tape being drivable selectively in a first direction from said first to second flywheels and a second direction from said second to first flywheels in response to energization of said motor; and
    means for shifting said endless belt between a first position in which said endless belt is looped around said larger-diameter portion of said first flywheel, said smaller-diameter portion of said second flywheel, and said first pulley portion when the magnetic tape runs in said first direction, and a second position in which said endless belt is looped around said smaller-diameter portion of said first flywheel, said larger-diameter portion of said second flywheel, and said second pulley portion when the magnetic tape runs in said second direction, whereby said capstans rotate at different speeds to tension a portion of the magnetic tape which extends between said capstans, wherein said means comprises a pair of arms each having a bifurcated end for guiding the belt, a bar interconnecting said arms, and a support rod on which said arms are pivotably supported for shifting movement between said first and second positions.

5. A capstan driving mechanism according to claim 4, wherein said arms are positioned one on each side of said motor pulley.

* * * * *